United States Patent
Rabinowitz et al.

(10) Patent No.: US 10,949,734 B2
(45) Date of Patent: Mar. 16, 2021

(54) PROGRESSIVE NEURAL NETWORKS

(71) Applicant: DeepMind Technologies Limited, London (GB)

(72) Inventors: Neil Charles Rabinowitz, St. Albans (GB); Guillaume Desjardins, London (GB); Andrei-Alexandru Rusu, London (GB); Koray Kavukcuoglu, London (GB); Raia Thais Hadsell, London (GB); Razvan Pascanu, Letchworth Garden City (GB); James Kirkpatrick, London (GB); Hubert Josef Soyer, London (GB)

(73) Assignee: DeepMind Technologies Limited, London (GB)

( * ) Notice: Subject to any disclaimer, the term of this patent is extended or adjusted under 35 U.S.C. 154(b) by 1040 days.

(21) Appl. No.: 15/396,319

(22) Filed: Dec. 30, 2016

(65) Prior Publication Data
US 2017/0337464 A1    Nov. 23, 2017

Related U.S. Application Data

(60) Provisional application No. 62/339,719, filed on May 20, 2016.

(51) Int. Cl.
*G06N 3/04* (2006.01)
*G06N 3/08* (2006.01)
*G06F 17/16* (2006.01)

(52) U.S. Cl.
CPC ........... *G06N 3/0454* (2013.01); *G06F 17/16* (2013.01); *G06N 3/08* (2013.01)

(58) Field of Classification Search
USPC .......................................................... 706/25
See application file for complete search history.

(56) References Cited

U.S. PATENT DOCUMENTS 5,572,628 A * 11/1996 Denker .................... G06K 9/52
 706/20
5,748,847 A *  5/1998 Lo ............................ G06N 3/08
 706/14

(Continued)

OTHER PUBLICATIONS

W. Huang, H. Hong, G. Song and K. Xie, "Deep process neural network for temporal deep learning," 2014 International Joint Conference on Neural Networks (IJCNN), Beijing, 2014, pp. 465-472 (Year: 2014).*

(Continued)

*Primary Examiner* — James D. Rutten
(74) *Attorney, Agent, or Firm* — Fish & Richardson P.C.

(57) ABSTRACT

Methods and systems for performing a sequence of machine learning tasks. One system includes a sequence of deep neural networks (DNNs), including: a first DNN corresponding to a first machine learning task, wherein the first DNN comprises a first plurality of indexed layers, and each layer in the first plurality of indexed layers is configured to receive a respective layer input and process the layer input to generate a respective layer output; and one or more subsequent DNNs corresponding to one or more respective machine learning tasks, wherein each subsequent DNN comprises a respective plurality of indexed layers, and each layer in a respective plurality of indexed layers with index greater than one receives input from a preceding layer of the respective subsequent DNN, and one or more preceding layers of respective preceding DNNs, wherein a preceding layer is a layer whose index is one less than the current index.

23 Claims, 3 Drawing Sheets

(56) References Cited

U.S. PATENT DOCUMENTS

2014/0257803 A1* 9/2014 Yu .................. G06N 3/0481
704/232
2019/0232489 A1* 8/2019 Pascanu ............ G06N 3/0454

OTHER PUBLICATIONS

H. Su, G. Li, D. Yu and F. Seide, "Error back propagation for sequence training of Context-Dependent Deep Networks for conversational speech transcription," 2013 IEEE International Conference on Acoustics, Speech and Signal Processing, Vancouver, BC, 2013, pp. 6664-6668 (Year: 2013).*
International Preliminary Report on Patentability issued in International Application No. PCT/US2016/069589, dated Jul. 26, 2018, 9 pages.
International Search Report and Written Opinion in International Application No. PCT/US2016/069589, dated Mar. 20, 2017, 15 pages.
Terekhov et al. "Knowledge Transfer in Deep Block-Modular Neural Networks," Network and Parallel Computing; [Lecture notes in computer science; Lect. Notes Computer], Springer International Publishing, Cham, Jul. 24, 2015, 12 pages.
Agostinelli et al. "Adaptive multi-column deep neural networks with application to robust image denoising," Advances in Neural Information Processing Systems, 2013, 9 pages.
Amari. "Natural gradient works efficiently in learning," Neural Computation 10(2), Feb. 15, 1998, 36 pages.
Bellemare et al. "The arcade learning environment: An evaluation platform for general agents," Journal of Artificial Intelligence Research, Jul. 19, 2012, 27 pages.
Bengio. "Deep learning of representations for unsupervised and transfer learning," JMLR: Unsupervised and Transfer Learning, 27, 2012, 21 pages.
Ciregan et al. "Multi-column deep neural networks for image classification," Conference on Computer Vision and Pattern Recognition, Jun. 15, 2012, 8 pages.
Fahlman et al. "The cascade-correlation learning architecture," Advances in Neural Information Processing Systems, 1990, 9 pages.
Hinton et al. "Reducing the dimensionality of data with neural networks," Science 313(5786), Jul. 28, 2006, 4 pages.
Hinton et al. "Distilling the knowledge in a neural network," arXiv preprint arXiv1503.02531, Mar. 9, 2015, 9 pages.
LeCun et al. "Optimal brain damage," Advances in Neural Information Processing Systems vol. 2, Nov. 1989, 8 pages.
Lin et al. "Network in network," arXiv preprint arXiv 1312.4400v3, Mar. 4, 2014, 10 pages.
Mesnil et al. "Unsupervised and transfer learning challenge: a deep learning approach," Proceedings of the Unsupervised and Transfer Learning challenge and workshop, vol. 27, 2012, 15 pages.
Mnih et al. "Human-level control through deep reinforcement learning," Nature 518.7540, Feb. 26, 2015, 13 pages.
Mnih et al. "Asynchronous methods for deep reinforcement learning," International Conference on Machine Learning, Jun. 11, 2016, 10 pages.
Parisotto et al. "Actor-mimic: Deep multitask and transfer reinforcement learning," arXiv preprint arXiv 1511.06342v4, Feb. 22, 2016, 16 pages.
Ring. "Continual Learning in Reinforcement Environments," Doctoral dissertation, University of Texas at Austin, Aug. 1994, 138 pages.
Rozantsev et al. "Beyond sharing weights for deep domain adaptation," arXiv preprint arXiv 1603.06432v2, Nov. 17, 2016, 10 pages.
Rusu et al. "Policy distillation," arXiv preprint arXiv1511.06295v2, Jan. 7, 2016, 13 pages.
Ruvolo et al. "Ella: An efficient lifelong learning algorithm," Proceedings of the 30$^{th}$ International Conference on Machine Learning, Jun. 16, 2013, 9 pages.
Silver et al. "Lifelong machine learning systems: Beyond learning algorithms," AAAI Spring Symposium: Lifelong Machine Learning, vol. 13, Mar. 25, 2013, 7 pages.
Taylor et al. "An introduction to inter-task transfer for reinforcement learning," AI Magazine, 32(1) Mar. 16, 2011, 20 pages.
Tessler et al "A Deep Hierarchical Approach to Lifelong Learning in Minecraft," arXiv preprint arXiv 1604.07255v3, Nov. 30, 2016, 10 pages.
Yosinski et al. "How transferable are features in deep neural networks?" Advances in neural Information Processing Systems, 2014, 9 pages.
Zhou et al. "online incremental feature learning with denoising autoencoders," Proceedings of the International Conference on Artificial Intelligence and Statistics, Ann Arbor, 1001, 2012, 9 pages.

* cited by examiner

PROGRESSIVE NEURAL NETWORKS

CROSS-REFERENCE TO RELATED APPLICATION

This application claims priority to U.S. Provisional Application No. 62/339,719, filed on May 20, 2016. The disclosure of the prior application is considered part of and is incorporated by reference in the disclosure of this application.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations can learn multiple machine learning tasks in sequence, where task features are preserved so that new tasks can benefit from all previously learnt features.

In general, one innovative aspect of the subject matter described in this specification can be embodied in a neural network system implemented by one or more computers, the neural network system comprising a sequence of deep neural networks (DNNs), wherein each DNN in the sequence of DNNs has been trained to perform a respective machine learning task, and wherein the sequence of DNN comprises: a first DNN that corresponds to a first machine learning task, wherein (i) the first DNN comprises a first plurality of indexed layers, and (ii) each layer in the first plurality of indexed layers is configured to receive a respective layer input and process the layer input to generate a respective layer output; and one or more subsequent DNNs corresponding to one or more respective machine learning tasks, wherein (i) each subsequent DNN comprises a respective plurality of indexed layers, and (ii) each layer in a respective plurality of indexed layers with index greater than one receives input from (i) a preceding layer of the respective subsequent DNN, and (ii) one or more preceding layers of respective preceding DNNs, wherein a preceding layer is a layer whose index is one less than the current index.

The foregoing and other embodiments can each optionally include one or more of the following features, alone or in combination. In some implementations each layer with index equal to one in a respective plurality of indexed layers receives a respective subsequent DNN input.

In some implementations (i) the first plurality of indexed layers comprises L hidden layers, and (ii) each respective plurality of indexed layers s comprises $M_s$ hidden layers.

In some implementations L is not equal to $M_s$ for each s.

In some implementations L is equal to $M_s$ for one or more s.

In some implementations each layer in the first plurality of indexed layers comprises a hidden activation $h_i^{(1)} \in \mathbb{R}^{n_i}$, where $n_i$ represents a number of hidden units at layer $i \leq L$.

In some implementations each layer in a respective plurality of indexed layers s comprises a hidden activation $h_j^{(s)} \in \mathbb{R}^{n_j}$, where $n_j$ represents a number of hidden units at layer $j \leq M_s$.

In some implementations the sequence of machine learning tasks comprises k+1 machine learning tasks, and wherein an activation of the k-th subsequent DNN is given by $$h_i^{(k)} = \sigma\left(W_i^{(k)} h_{i-1}^{(k)} + \sum_{j<k} U_{ij}^{(k)} h_{i-1}^{(j)}\right)$$

wherein $h_i^{(k)}$ represents an activation of the k-th subsequent DNN, $W_i^{(k)} \in \mathbb{R}^{n_i \times n_{i-1}}$ represents a weight matrix of layer i of the k-th subsequent DNN, $U_{ij}^{(k)} \in \mathbb{R}^{n_i \times n_j}$ represents lateral connections from layer i of the k-th subsequent DNN to layer i−1 of the j-th subsequent DNN and σ represents an element-wise non linearity.

In some implementations the sequence of machine learning tasks comprises k machine learning tasks, and wherein an activation of the k-th subsequent DNN is given by $$h_i^{(k)} = \sigma(W_i^{(k)} h_{i-1}^{(k)} + U_{ij}^{(k)} \sigma(V_{ij}^{(k)} \alpha_{i-1}^{(<k)} \alpha_{i-1}^{(<k)} h_{i-1}^{(<k)}))$$

wherein $h_i^{(k)}$ represents an activation of the k-th subsequent DNN, $W_i^{(k)} \in \mathbb{R}^{n_i \times n_{i-1}}$ represents a weight matrix of layer i of the k-th subsequent DNN, $U_{ij}^{(k)} \in \mathbb{R}^{n_i \times n_j}$ represents lateral connections from layer i of the k-th subsequent DNN to layer i−1 of the j-th subsequent DNN, σ represents an element-wise non linearity, $V_{ij}^{(k)} \in \mathbb{R}^{n_i \times n_{i-1}^{(<k)}}$ represents a projection matrix and $\alpha_{i-1}^{(<k)}$ is a learned scalar.

In some implementations the sequence of machine learning tasks comprises independent machine learning tasks.

In some implementations the sequence of machine learning tasks comprises one or more of (i) adversarial machine learning tasks, (ii) classification tasks, (iii) robot learning tasks, or (iv) generative modeling tasks.

In general, another innovative aspect of the subject matter described in this specification can be embodied in a method for sequentially training a sequence of deep neural networks (DNNs) to perform a sequence of machine learning tasks, each DNN in the sequence corresponding to a respective machine learning task, and the method comprising: for a first machine learning task in the sequence: training a first DNN in the sequence that corresponds to the first machine learning task to perform the first machine learning task, wherein (i) the first DNN comprises a first plurality of indexed layers, and (ii) each layer in the first plurality of indexed layers is configured to receive a respective layer input and process the layer input to generate a respective layer output; for each subsequent machine learning task in the sequence: training a subsequent DNN corresponding to the machine learning task to perform the machine learning task, wherein (i) the subsequent DNN comprises a subsequent plurality of indexed layers, and (ii) each layer with index greater than one in the subsequent indexed plurality of layers receives input from (i) a preceding layer of the subsequent DNN, and (ii) one or more preceding layers of respective preceding DNNs, wherein a preceding layer is a layer whose index is one less than the current index.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations each DNN layer with index equal to one in a respective plurality of indexed layers receives a respective subsequent DNN input.

In some implementations the sequence of machine learning tasks comprises independent machine learning tasks.

In some implementations the sequence of machine learning tasks comprises one or more of (i) adversarial machine learning tasks, (ii) classification tasks, (iii) robot learning tasks, or (iv) generative modeling tasks.

In some implementations (i) the first DNN comprises one or more respective DNN parameters, and (ii) each subsequent DNN comprises one or more respective subsequent DNN parameters, and training each subsequent DNN comprises setting preceding DNN parameters of preceding DNNs to constant values.

In some implementations training each subsequent DNN further comprises adjusting values of the respective subsequent DNN parameters using a machine learning training technique.

In general, another innovative aspect of the subject matter described in this specification can be embodied in a method for processing an input using a sequence of deep neural networks (DNNs), wherein each DNN in the sequence of DNNs has been trained to perform a respective machine learning task, the sequence of DNN comprising: a first DNN that corresponds to a first machine learning task, wherein (i) the first DNN comprises a first plurality of indexed layers, and (ii) each layer in the first plurality of indexed layers is configured to receive a respective layer input and process the layer input to generate a respective layer output; and one or more subsequent DNNs corresponding to one or more respective machine learning tasks, wherein (i) each subsequent DNN comprises a respective plurality of indexed layers, and (ii) each layer in a respective plurality of indexed layers with index greater than one receives input from (i) a preceding layer of the respective subsequent DNN, and (ii) one or more preceding layers of respective preceding DNNs, wherein a preceding layer is a layer whose index is one less than the current index; the method comprising: receiving an input as part of a machine learning task corresponding to a last subsequent DNN in the sequence of DNNs; and processing the input using the last subsequent DNN in the sequence to generate a last subsequent DNN output for the machine learning task.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations each layer with index equal to one in a respective plurality of indexed layers receives a respective subsequent DNN input.

In some implementations the machine learning task corresponding to the last subsequent DNN in the sequence of DNNs comprises (i) an adversarial machine learning task, (ii) a classification task, (iii) a robot learning task or (iv) a generative modeling task.

The subject matter described in this specification can be implemented in particular embodiments so as to realize one or more of the following advantages.

To implement transfer learning in neural networks, systems typically perform fine-tuning methods. For example, a neural network may be pre-trained on a source domain (where data is often abundant), the output layers of the neural network may be adapted to the target domain, and the neural network may be fine-tuned using machine learning techniques such as backpropagation. In some settings, e.g., when performing a single task, such fine-tuning methods may suffice. However, in other settings, e.g., when implementing transfer learning across multiple tasks, such methods may suffer from several flaws and may not suffice. For example, while fine-tuning methods may allow the recovery of expert performance in the target domain, it is a destructive process that discards previously learnt neural network parameters corresponding to previous tasks. To overcome these problems, each neural network may be copied before fine-tuning to explicitly remember all previous tasks.

In some cases, distillation methods may provide a potential solution to multi-task learning. However, distillation methods assume that training data is available for all tasks an assumption which may not always hold.

A progressive neural network system, as described in this specification, provides a model architecture that, by construction, supports transfer learning across sequences of machine learning tasks. While systems implementing fine-tuning methods incorporate previously learned knowledge only at initialization, the structure of progressive neural network systems allows for previously learned knowledge from previously trained models to be integrated at each layer of the current model. By combining previously learnt knowledge in this manner, progressive neural network systems have a more complex compositionality. Such a compositionality may enable a progressive neural network system to achieve a learning speed up compared to other neural network systems.

In addition, progressive neural network systems naturally accumulate experiences and are immune to forgetting by design, making them ideally suited to tackling continual or lifelong learning tasks.

A progressive neural network system, as described in this specification, does not assume that the machine learning tasks on which it is trained are related or similar. For example, other neural network systems that implement standard pre-train and fine tune methods, often assume that the machine learning tasks on which they are trained are overlapping. Conversely, a progressive neural network system makes no such assumptions, and may even be applied to settings where machine learning tasks are orthogonal or even adversarial. In particular, progressive neural network systems allocate new deep neural networks for each new task, whose weights are initialized randomly. Such deep neural networks are free to reuse, modify or ignore previously learned features through lateral connections between previous deep neural networks. The lateral connections, in combination with freezing previously learned parameters when training a new deep neural network, ensures that there is no interference between machine learning tasks and prevents catastrophic forgetting.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
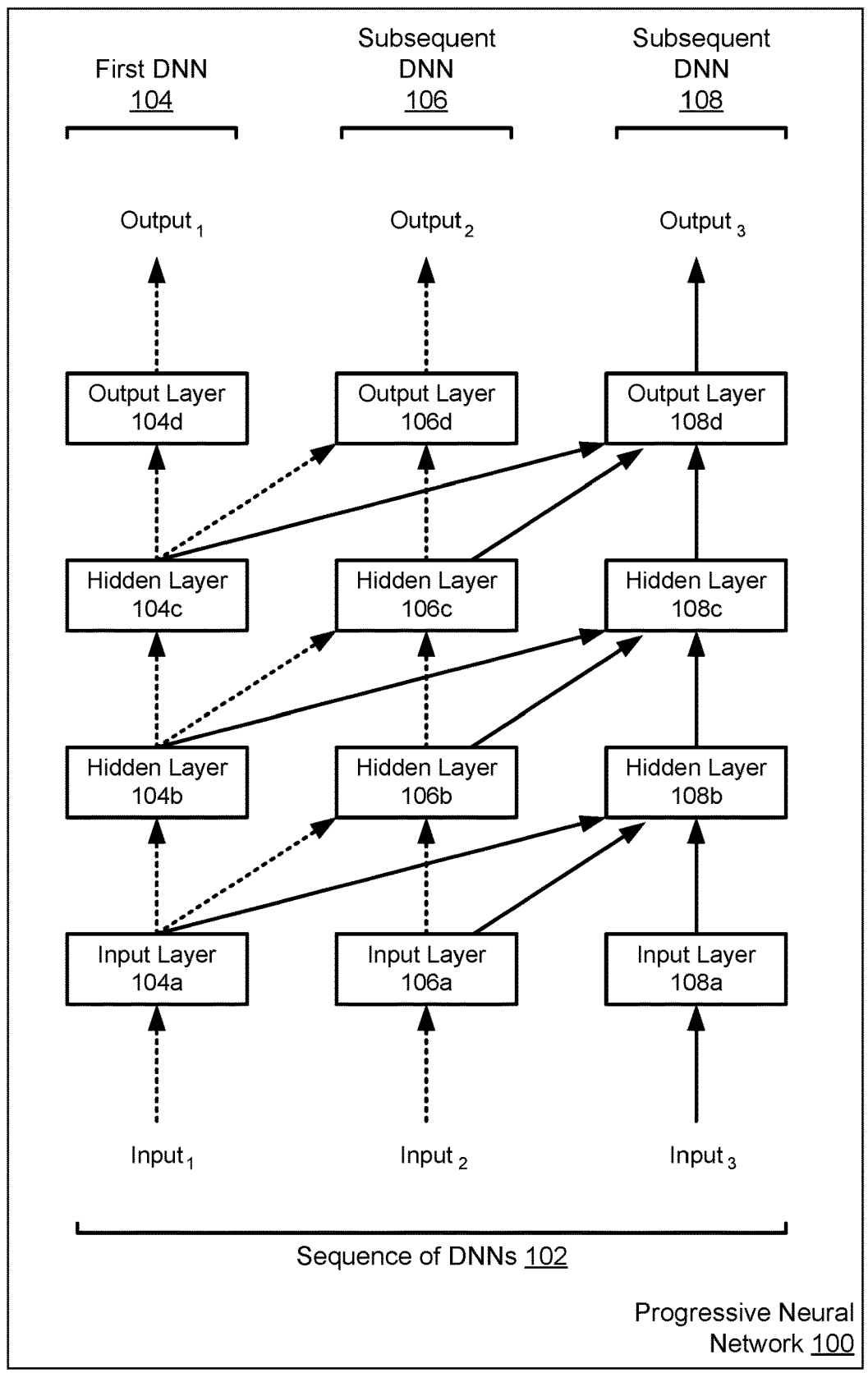
FIG. 1 shows an example progressive neural network system.

FIG. 1 shows an example progressive neural network system 100. The system 100 is an example of a system implemented as computer programs on one or more computers in one or more locations, in which the systems, components, and techniques described below can be implemented.

The progressive neural network system 100 may learn multiple machine learning tasks in sequence, where task features are preserved so that new tasks can benefit from all previously learned features and so that the final neural network system can be evaluated on each machine learning task.

In some implementations the multiple machine learning tasks includes one or more independent machine learning tasks, e.g., machine learning tasks whose relationships are orthogonal to each other. In some implementations one or more of the machine learning tasks in include adversarial machine learning tasks. In some implementations the machine learning tasks in the sequence of machine learning tasks may include different classification tasks, such as image processing tasks, speech recognition tasks, natural language processing tasks, or optical character recognition tasks. For example, a sequence of machine learning tasks including image processing tasks may include one or more different image recognition tasks, where each image recognition task requires the recognition of a different object or pattern in an image. As another example, a sequence of machine learning tasks including speech recognition tasks may include one or more hotword detection tasks, where each task requires the recognition of a different hotword or sequence of hotwords.

In some implementations the machine learning tasks in the sequence of machine learning tasks may include robot learning tasks. For example, a first machine learning task in the sequence of machine learning tasks may include a sensorimotor learning task such as locomotion. A second machine learning task in the sequence of machine learning tasks may include a second sensorimotor learning task such as grasping. Subsequent machine learning tasks in the sequence of machine learning tasks may include other sensorimotor learning tasks such as active object categorization, or interactive learning tasks such as joint manipulation of an object with a human peer, or linguistic learning tasks such as the situated meaning of human language.

In some implementations the machine learning tasks in the sequence of machine learning tasks may include generative modeling tasks, e.g., density estimation tasks.

The progressive neural network system 100 includes a sequence of Deep Neural Networks (DNNs) 102. For example, as shown in FIG. 1, the sequence of DNNs may include a first DNN 104 and one or more subsequent DNNs. For convenience, FIG. 1 shows two subsequent DNNs, e.g., subsequent DNNs 106 and 108. However, in some cases the progressive neural network system 100 may include more or fewer subsequent DNNs.

The type of DNNs included in the sequence of DNNs is dependent on the type of machine learning tasks that the DNNs are trained to perform. For example, in cases where the sequence of machine learning tasks includes language modeling tasks, the sequence of DNNs 102 may include one or more recurrent neural networks, e.g., long short term memory neural networks. As another example, in cases where the sequence of machine learning tasks includes image classification tasks or acoustic modeling tasks, the sequence of DNNs may include one or more convolutional neural networks. Further example machine learning tasks that the sequence of DNNs may be trained to perform are described below with reference to FIG. 2.

The first DNN 104 in the sequence of DNNs 102 corresponds to a first machine learning task in the sequence of machine learning tasks. That is, the first DNN 104 in the sequence of DNNs 102 is a DNN that is configured to perform a first machine learning task, e.g., through training on appropriate training data. The first DNN 104 includes multiple neural network layers, e.g., input layer 104a, hidden layers 104b and 104c, and output layer 104d. For convenience, the first DNN 104 is illustrated as having four neural network layers, however in some cases the first DNN 104 may include more or fewer neural network layers. For example, generally, the first DNN 104 may include L indexed layers e.g., layers i=1, . . . , L. Layer i=1 may correspond to a bottom input layer of the first DNN 104, e.g., input layer 104a, that is configured to receive a first DNN input, e.g., input 1. Layer i=L may correspond to a top output layer of the first DNN 104, e.g., output layer 104d, that is configured to output a first DNN output, e.g., output 1. In addition, for convenience, the DNNs in the sequence of DNNs are illustrated as columns having stacked neural network layers. However, in some implementations the DNNs in the sequence of DNNs may be columns that include other types of neural network layers, e.g., long short term memory recurrent neural network layers.

Each neural network layer in the multiple neural network layers of the first DNN 104 may contain one or more hidden units and may be configured to receive a respective layer input, e.g., from a preceding neural network layer, and to process the layer input to generate a respective layer output. As described above, in some implementations the multiple layers may include L indexed neural network layers. Each of the L layers generate a respective layer output in accordance with parameters $\Theta_i^{(1)}$ for the neural network layer. The neural network layer parameters $\Theta_i^{(1)}$ are parameters that may be trained, e.g., using standard backpropagation techniques. Training a first DNN in a progressive neural network system is described in more detail below with reference to FIG. 2.

Subsequent DNNs in the sequence of DNNs 102 correspond to subsequent machine learning tasks in the sequence of machine learning tasks. That is, each subsequent DNN in the sequence of DNNs is a DNN that may be configured to perform a subsequent machine learning task, e.g., through training on appropriate training data. Each subsequent DNN, e.g., subsequent DNNs 106 and 108, include multiple neural network layers. For example, subsequent DNN 106 includes input layer 106a, hidden layers 106b and 106c, and output layer 106d. Similarly, subsequent DNN 108 includes input layer 108a, hidden layers 108b and 108c, and output layer 108d. For convenience, the subsequent DNNs 106 and 108 are illustrated as having four neural network layers each. However, in some cases each of the subsequent DNNs may include more or fewer neural network layers. For example, generally, a subsequent DNN may include M indexed neural network layers, e.g., i=1, . . . , M. Layer i=1 may correspond to a bottom neural network layer of the subsequent DNN, e.g., input layer 106a or 108a, that is configured to receive a subsequent DNN input, e.g., input 2 or input 3. Layer i=M may correspond to a top neural network layer of the subsequent DNN, e.g., output layer 106d or 108d, that is configured to output a subsequent DNN output, e.g., output 2 or output 3.

Each neural network layer in a subsequent DNN with index greater than one is configured to receive input from (i) a preceding layer of the subsequent DNN, and (ii) one or more preceding layers of respective preceding DNNs, where a preceding layer is a layer whose index is one less than the current index. For example, neural network layer 106b of subsequent DNN 106 is configured to receive input from (i) neural network layer 106a of DNN 106, and (ii) neural network layer 104a of DNN 104. Similarly, neural network layer 106c of subsequent DNN 106 is configured to receive input from (i) neural network layer 106b of DNN 106, and (ii) neural network layer 104b of DNN 104.

As a general example, a neural network layer l of a subsequent DNN may receive input from neural network layer l−1 of the DNN, and input from one or more preceding neural network layers l−1 of respective preceding DNNs. For example, a neural network layer l of a third DNN in the sequence of DNNs may receive input from neural network layer l−1 of the third DNN and two inputs from neural network layers l−1 of the first and second DNN, respectively. A neural network layer with index equal to one receives a respective DNN input, e.g., inputs 2 and 3. A one-to one correspondence between DNNs is not required- layers in a subsequent DNN may be connected to every other layer of a preceding DNN, for example. As another example, some of a preceding DNN may not be used at all, e.g., one or more layers of a preceding DNN may only include connections between layers within the preceding DNN.

In some implementations each subsequent DNN s may include $M_s$ neural network layers, where each layer i of the $M_s$ layers includes a hidden activation $h_i^{(s)} \in \mathbb{R}^{n_i}$, with $n_i$ representing a number of hidden units at layer i≤$M_s$. In some cases the number of layers L in the first DNN may not be equal to the number of layers in each subsequent DNN, e.g., L may not be equal to $M_s$ for each s. In other cases the number of layers L in the first DNN may be equal to the number of layers in one or more of the subsequent DNNs, e.g., L may be equal to $M_s$ for one or more s. In some cases the numbers of layers in the subsequent DNNs may vary, e.g., $M_s$ is not the same for each s.

As described above, the progressive neural network system 100 may be trained to perform a sequence of machine learning tasks. The first DNN 104 in the sequence of DNNs 102 corresponds to a first machine learning task in the sequence of machine learning tasks, that is the first DNN 104 in the sequence of DNNs 102 is a DNN that may be configured to perform a first machine learning task, e.g., through training on appropriate training data. When a second machine learning task in the sequence of machine learning tasks is received or selected, a subsequent DNN, e.g., DNN 106, is instantiated. Each time a subsequent machine learning task in the sequence of machine learning tasks is received or selected, a corresponding subsequent DNN is instantiated. In this manner, the total number of DNNs in the progressive neural network system 100 may be equal to the number of machine learning tasks in the sequence of machine learning tasks.

In some implementations the sequence of machine learning tasks may include K+1 machine learning tasks. In these cases, a hidden activation of an i-th layer of a k-th subsequent DNN may be given by $$h_i^{(k)} = \sigma\left(W_i^{(k)} h_{i-1}^{(k)} + \sum_{j<k} U_{ij}^{(k)} h_{i-1}^{(j)}\right) \quad (1)$$

wherein $h_i^{(k)}$ represents an activation of the k-th subsequent DNN, $W_i^{(k)} \in \mathbb{R}^{n_i \times n_{i-1}}$ represents a weight or parameter matrix of layer i of the k-th subsequent DNN, $U_{ij}^{(k)} \in \mathbb{R}^{n_i \times n_j}$ represents lateral connections from layer i of the k-th subsequent DNN to layer i−1 of the k−1-th subsequent DNN and a represents an element-wise non linearity. In some implementations σ(x)=max(0,x). Generally, a different activation may be applied to different DNN layers it is not required that the same transformation be applied at each DNN layer. FIG. 1 illustrates the above described system with K=3.

In some implementations a DNN layer may be augmented with non-linear lateral connections to other DNN layers. In other words, the connections from other DNN layers need not only represent simple readings of information from the other DNNs. Rather, the connections may represent learned, possibly non-linear transformations of the information. In some cases, such non-linear lateral connections may improve initial conditioning and perform dimensionality reduction.

For example, a basic lateral connection is described above with reference to equation (1). Such basic lateral connections can be replaced with a single hidden layer multilayer perceptron (MLP) whose first layer is a projection onto an $n_{i-1}$ dimensional subspace. By replacing basic lateral connections with non-linear lateral connections, the number of parameters stemming from the lateral connections may be of the same order as the magnitude of the parameters for the first DNN.

For example, the sequence of machine learning tasks may include K+1 machine learning tasks, and an activation of an i-th layer of a k-th subsequent DNN may be given by $$h_i^{(k)} = \sigma(W_i^{(k)} h_{i-1}^{(k)} + U_{ij}^{(k)} \sigma(V_{ij}^{(k)} \alpha_{i-1}^{(<k)} \alpha_{i-1}^{(<k)} h_{i-1}^{(<k)})) \quad (2)$$

where $h_i^{(k)}$ represents an activation of the k-th subsequent DNN, $W_i^{(k)} \in \mathbb{R}^{n_i \times n_{i-1}}$ represents a weight or parameter matrix of layer i of the k-th subsequent DNN, $U_{ij}^{(k)} \in \mathbb{R}^{n_i \times n_j}$ represents lateral connections from layer i of the k-th subsequent DNN to layer i−1 of the j-th subsequent DNN, σ represents an element-wise non linearity, $V_{ij}^{(k)} \in \mathbb{R}^{n_i \times n_{i-1}^{(<k)}}$ represents a projection matrix and $\sigma_{i-1}^{(<k)}$ is a learned scalar, e.g., initialized to a small random value to ensure that the scale of $h_{i-1}^{(<k)}$ and $h_{i-1}^{(k)}$ are comparable at initialization. In cases where the k-th subsequent DNN is a fully connected layer, lateral connections can be replaced by including an additional linear layer, with a potentially different number of outputs compared to the number of inputs. In cases where the k-th subsequent DNN is a convolutional neural network, lateral connections can be replaced by performing 1×1 convolutions across image height and width and using dense fully connected input and output connections. In some cases an additional nonlinearity can be added on top of such a layer before representations are concatenated and fed to the current DNN.

In some implementations, the K+1 machine learning tasks may be independent machine learning tasks, that is no assumptions regarding the type of tasks or relationships between the K tasks are made. For example, the K+1 machine learning tasks may be orthogonal or adversarial. Training a progressive neural network system to perform K+1 machine learning tasks, and processing an input, e.g., corresponding to a K+1-th machine learning task using a progressive neural network is described below with reference to FIGS. 2 and 3, respectively.

Figure 2:
FIG. 2 is a flow diagram of an example process for training a progressive neural network system to perform a sequence of machine learning tasks.

FIG. 2 is a flow diagram of an example process 200 for training a progressive neural network system to perform a sequence of machine learning tasks. For convenience, the process 200 will be described as being performed by a system of one or more computers located in one or more locations. For example, a system including a sequence of deep neural networks (DNNs), where each DNN in the sequence corresponds to a respective machine learning task, appropriately programmed in accordance with this specification, can perform the process 200. For example, the progressive neural network system 100 of FIG. 1, appropriately programmed in accordance with this specification, can perform the process 200.

For a first machine learning task in the sequence, the system trains a first DNN in the sequence that corresponds to the first machine learning task to perform the first machine learning task (step 202). The first DNN may include a first number of indexed layers, e.g., L hidden layers, where each layer in the first number of indexed layers is configured to receive a respective layer input and process the layer input to generate a respective layer output according to one or more respective first DNN parameters.

In some implementations each layer in the first number of indexed layers may include a hidden activation $h_i^{(1)} \in \mathbb{R}^{n_i}$, where $n_i$ represents a number of hidden units at layer $i \leq L$.

For each subsequent machine learning task in the sequence, the system trains a subsequent DNN corresponding to the machine learning task to perform the machine learning task (step 204). The system need not perform a same learning algorithm to train a subsequent DNNs as learning algorithms used to train preceding DNNs, e.g., the first DNN. In other words, the system may apply different training algorithms to each of the DNNs in the sequence of DNNs. For example, one or more of the DNNs in the sequence of DNNs may be trained on image classification, whereas one or more other DNNs in the sequence of DNNs may be trained on generative modeling tasks, e.g., may be variational auto-encoders.

The subsequent DNN may include a subsequent number of indexed layers, where each layer with index greater than one in the subsequent number of indexed layers receives input from (i) a preceding layer of the subsequent DNN, that is a layer whose index is one less than the current index, and (ii) one or more preceding layers of respective preceding DNNs. In some implementations, each layer with index equal to one in a subsequent plurality of indexed layers receives a respective subsequent DNN input. Each layer in the subsequent number of indexed layers is configured to receive a respective layer input and process the layer input to generate a respective layer output according to one or more respective subsequent DNN parameters.

In some implementations training each subsequent DNN may include setting preceding DNN parameters of preceding DNNs to constant values, e.g., to previously trained values, and adjusting values of the respective subsequent DNN parameters using a machine learning training technique, e.g., backpropagation of gradients. In some implementations each subsequent DNN corresponding to a subsequent machine learning task is randomly initialized prior to training. In other implementations each subsequent DNN corresponding to a subsequent machine learning task may be initialized so that the subsequent DNN initially produces a same output as a preceding DNN. The initialization of each subsequent DNN affects how equation (1) above is instantiated at the output layer.

Figure 3:
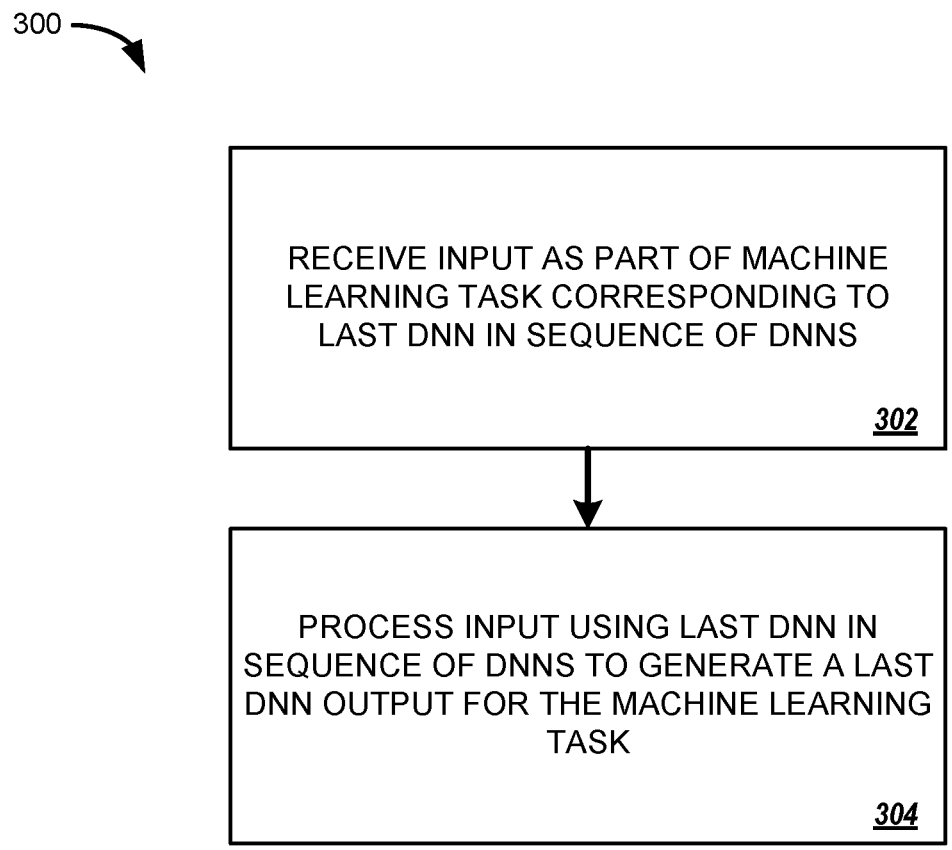
FIG. 3 is a flow diagram of an example process for processing an input using a progressive neural network.

FIG. 3 is a flow diagram of an example process 300 for processing an input using a progressive neural network. For convenience, the process 300 will be described as being performed by a system of one or more computers located in one or more locations. For example, a system including a sequence of deep neural networks (DNNs), e.g., the progressive neural network system 100 of FIG. 1, appropriately programmed in accordance with this specification, can perform the process 300.

The system receives an input as part of a machine learning task corresponding to a last subsequent DNN in the sequence of DNNs (step 302). For example, the input may be an input that is part of a machine learning task corresponding to a K+1-th machine learning task in a sequence of machine learning tasks. The K+1-th machine learning task may be independent to other machine learning tasks in the sequence of machine learning tasks, that is the K+1-th machine learning task may be orthogonal or adversarial to one or more of the other machine learning tasks in the sequence of machine learning tasks.

The system processes the input using the last subsequent DNN in the sequence to generate a last subsequent DNN output for the machine learning task (step 304). The last subsequent DNN includes a number of indexed layers, and (ii) each layer in the number of indexed layers with index greater than one receives input from (i) a preceding layer of the last subsequent DNN, and (ii) one or more preceding layers of each preceding DNN in the sequence of DNNs, where a preceding layer is a layer whose index is one less than the current index. Each layer with index equal to one in a respective plurality of indexed layers receives a respective subsequent DNN input.

Due to the structure of the system, as described above with reference to FIG. 1, the system processes the received input using features learnt from previous machine learning tasks in the sequence of machine learning tasks. That is, the system processes the received input using not only the last subsequent DNN in the sequence, but also each DNN to which at least one layer of the last subsequent DNN is connected to. This structure is applicable even if the machine learning task corresponding to the received input is unrelated to previous machine learning tasks performed by previous DNNs.

In some implementations the received input may part of a classification machine learning task, such as an image processing task, speech recognition task, natural language processing task, or optical character recognition task. In these cases, the generated output may include an output that classifies the received input.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system implemented by one or more computers, the neural network system comprising a sequence of deep neural networks (DNNs),
    wherein each DNN in the sequence of DNNs has been trained to perform a respective machine learning task, and wherein the sequence of DNN comprises:
        a first DNN that corresponds to a first machine learning task, wherein (i) the first DNN comprises a first plurality of indexed layers, and (ii) each layer in the first plurality of indexed layers is configured to receive a respective layer input and process the layer input to generate a respective layer output; and
        one or more subsequent DNNs corresponding to one or more respective machine learning tasks, wherein (i) each subsequent DNN comprises a respective plurality of indexed layers, and (ii) each layer in a respective plurality of indexed layers with index greater than one receives input from (i) a preceding layer of the respective subsequent DNN, and (ii) one or more preceding layers of respective preceding DNNs, wherein a preceding layer is a layer whose index is one less than a current index, and wherein the input from one or more preceding layers of respective preceding DNNs is generated by applying respective non-linear lateral connections to the respective layer outputs of the one or more preceding layers of respective preceding DNN, wherein the respective non-linear lateral connections represent a learned, non-linear transformation of the respective layer outputs of the one or more preceding layers of the respective preceding DNNs.

2. The system of claim 1, wherein each layer with index equal to one in a respective plurality of indexed layers receives a respective subsequent DNN input.

3. The system of claim 1, wherein (i) the first plurality of indexed layers comprises L hidden layers, and (ii) each respective plurality of indexed layers s comprises $M_s$ hidden layers.

4. The system of claim 3, wherein L is not equal to $M_s$ for each s.

5. The system of claim 3, wherein L is equal to $M_s$ for one or more s.

6. The system of claim 3, wherein each layer in the first plurality of indexed layers comprises a hidden activation $h_i^{(1)} \in \mathbb{R}^{n_i}$, where $n_i$ represents a number of hidden units at a layer having index $i \leq L$ in the first DNN.

7. The system of claim 6, wherein each layer in a respective plurality of indexed layers in a subsequent DNN comprises a hidden activation $h_j^{(s)} \in \mathbb{R}^{n_j}$, where $n_j$ represents a number of hidden units at a layer having index $j \leq M_s$ in the subsequent DNN.

8. The system of claim 7, wherein a sequence of machine learning tasks comprises k machine learning tasks, and wherein an activation of a k-th subsequent DNN is given by $$h_i^{(k)} = \sigma(W_i^{(k)} h_{i-1}^{(k)} + U_{ij}^{(k)} \sigma(V_{ij}^{(k)} \alpha_{i-1}^{(<k)} \alpha_{i-1}^{(<k)} h_{i-1}^{(<k)}))$$

wherein $h_i^{(k)}$ represents an activation of a layer having the index i of the k-th subsequent DNN $h_{i-1}^{(k)}$ represents an activation of a layer having an index i−1 of the k-th subsequent DNN, $h_{i-1}^{(<k)}$ represents an activation of a layer having the index i−1 of a subsequent DNN with an index that is less than k, $W_i^{(k)}$ represents a weight matrix of the layer having the index i of the k-th subsequent DNN, $U_{ij}^{(k)}$ represents lateral connections from the layer having the index i of the k-th subsequent DNN to a layer having an index i−1 of a k−1th subsequent DNN, σ represents an element-wise non linearity, $V_{ij}^{(k)} \in \mathbb{R}^{n_{i-1} \times n_{i-1}^{(<k)}}$ represents a projection matrix and $\alpha_{i-1}^{(<k)}$ is a learned scalar.

9. The system of claim 8, wherein the sequence of machine learning tasks comprises independent machine learning tasks.

10. The system of claim 8, wherein the sequence of machine learning tasks comprises one or more of (i) adversarial machine learning tasks, (ii) classification tasks, (iii) robot learning tasks, or (iv) generative modeling tasks.

11. The system of claim 1 wherein each respective non-linear lateral connection is a multilayer perceptron (MLP).

12. The system of claim 1 wherein each respective non-linear lateral connection comprises a 1×1 convolution.

13. The system of claim 1 wherein a different transformation is applied at each DNN layer.

14. The system of claim 1 wherein each subsequent DNN comprises an input layer configured to receive an initial input which is not output from a preceding DNN.

15. A method for sequentially training a sequence of deep neural networks (DNNs) to perform a sequence of machine learning tasks, each DNN in the sequence corresponding to a respective machine learning task, and the method comprising:
    for a first machine learning task in the sequence:

training a first DNN in the sequence that corresponds to the first machine learning task to perform the first machine learning task, wherein (i) the first DNN comprises a first plurality of indexed layers, and (ii) each layer in the first plurality of indexed layers is configured to receive a respective layer input and process the layer input to generate a respective layer output;

for each subsequent machine learning task in the sequence:

training a subsequent DNN corresponding to the machine learning task to perform the machine learning task, wherein (i) the subsequent DNN comprises a subsequent plurality of indexed layers, and (ii) each layer with index greater than one in the subsequent indexed plurality of layers receives input from (i) a preceding layer of the subsequent DNN, and (ii) one or more preceding layers of respective preceding DNNs, wherein a preceding layer is a layer whose index is one less than a current index, and wherein the input from one or more preceding layers of respective preceding DNNs is generated by applying respective non-linear lateral connections to the respective layer outputs of the one or more preceding layers of respective preceding DNNs the respective non-linear lateral connections representing a learned, non-linear transformation of the respective layer outputs of the one or more preceding layers of the respective preceding DNNs.

16. The method of claim 15, wherein each DNN layer with index equal to one in a respective plurality of indexed layers receives a respective subsequent DNN input.

17. The method of claim 15, wherein the sequence of machine learning tasks comprises independent machine learning tasks.

18. The method of claim 15, wherein the sequence of machine learning tasks comprises one or more of (i) adversarial machine learning tasks, (ii) classification tasks, (iii) robot learning tasks, or (iv) generative modeling tasks.

19. The method of claim 15, wherein (i) the first DNN comprises one or more respective DNN parameters, and (ii) each subsequent DNN comprises one or more respective subsequent DNN parameters, and wherein training each subsequent DNN comprises setting preceding DNN parameters of preceding DNNs to constant values.

20. The method of claim 15, wherein training each subsequent DNN further comprises adjusting values of a respective subsequent DNN parameters using a machine learning training technique.

21. A method for processing an input using a sequence of deep neural networks (DNNs), wherein each DNN in the sequence of DNNs has been trained to perform a respective machine learning task, the sequence of DNN comprising:

a first DNN that corresponds to a first machine learning task, wherein (i) the first DNN comprises a first plurality of indexed layers, and (ii) each layer in the first plurality of indexed layers is configured to receive a respective layer input and process the layer input to generate a respective layer output; and one or more subsequent DNNs corresponding to one or more respective machine learning tasks, wherein (i) each subsequent DNN comprises a respective plurality of indexed layers, and (ii) each layer in a respective plurality of indexed layers with index greater than one receives input from (i) a preceding layer of the respective subsequent DNN, and (ii) one or more preceding layers of respective preceding DNNs, wherein a preceding layer is a layer whose index is one less than a current index, and wherein the input from one or more preceding layers of respective preceding DNNs is generated by applying respective non-linear lateral connections to the respective layer outputs of the one or more preceding layers of respective preceding DNNs wherein the respective non-linear lateral connections represent a learned, non-linear transformation of the respective layer outputs of the one or more preceding layers of the respective preceding DNNs;

the method comprising:

receiving an input as part of a machine learning task corresponding to a last subsequent DNN in the sequence of DNNs; and processing the input using the last subsequent DNN in the sequence to generate a last subsequent DNN output for the machine learning task.

22. The method of claim 21, wherein each layer with index equal to one in a respective plurality of indexed layers receives a respective subsequent DNN input.

23. The method of claim 21, wherein the machine learning task corresponding to the last subsequent DNN in the sequence of DNNs comprises (i) an adversarial machine learning task, (ii) a classification task, (iii) a robot learning task or (iv) a generative modeling task.

* * * * *